(12) United States Patent
McGee

(10) Patent No.: US 7,651,117 B1
(45) Date of Patent: Jan. 26, 2010

(54) COLLAPSIBLE TRAILER APPARATUS

(76) Inventor: Gregory R. McGee, 49 Knightsbridge Avenue, Glenwood (AU) 2768

( * ) Notice: Subject to any disclaimer, the term of this patent is extended or adjusted under 35 U.S.C. 154(b) by 513 days.

(21) Appl. No.: 11/554,551

(22) Filed: Oct. 30, 2006

(51) Int. Cl.
*B62B 1/04* (2006.01)
*B62B 1/12* (2006.01)
(52) U.S. Cl. .................... 280/656; 280/639; 280/652
(58) Field of Classification Search .................. None
See application file for complete search history.

(56) References Cited

U.S. PATENT DOCUMENTS

| | | | | |
|---|---|---|---|---|
| 3,612,600 | A | | 10/1971 | Salichs |
| 3,768,858 | A | * | 10/1973 | Boismier ............... 296/100.09 |
| 3,989,148 | A | * | 11/1976 | Donohue .................... 414/537 |
| 4,239,258 | A | * | 12/1980 | Burris ......................... 280/639 |
| 4,413,839 | A | * | 11/1983 | McCain ....................... 362/485 |
| 4,729,183 | A | * | 3/1988 | Tarter et al. .................... 40/766 |
| 4,768,806 | A | | 9/1988 | Tretreault |
| 5,328,192 | A | * | 7/1994 | Thompson ............... 280/47.24 |
| 5,354,090 | A | * | 10/1994 | Grovom ..................... 280/656 |
| D418,451 | S | * | 1/2000 | Konecheck ................ D12/101 |
| 6,109,644 | A | * | 8/2000 | Cox ............................. 280/652 |
| 6,378,893 | B1 | * | 4/2002 | Jager ........................... 280/656 |
| 6,511,092 | B1 | * | 1/2003 | Chepa ......................... 280/656 |
| 6,962,370 | B2 | | 11/2005 | Simpson |
| 7,059,626 | B2 | * | 6/2006 | Koch ........................... 280/656 |
| 7,097,182 | B1 | * | 8/2006 | Liu ................................ 280/42 |
| 7,243,966 | B1 | * | 7/2007 | Sheldon .................... 296/26.08 |
| 7,448,632 | B1 | * | 11/2008 | Nieto ....................... 280/47.24 |
| 2005/0105296 | A1 | * | 5/2005 | French ........................ 362/485 |
| 2006/0001243 | A1 | * | 1/2006 | Hsu ............................. 280/652 |

* cited by examiner

*Primary Examiner*—Lesley Morris
*Assistant Examiner*—Chiedu A Chibogu
(74) *Attorney, Agent, or Firm*—Crossley Patent Law; Mark Ashley Crossley

(57) ABSTRACT

A collapsible trailer apparatus which can be used in an extended length and stored in a collapsed and/or partially disassembled state. End members slideably fit within frame tubes and offer telescoping length choice of the apparatus. Side rails are removable, as are side panels. Side rails and side panels are available in varied length choices. The tongue is slideably fitted and adjustable in length. Prop legs are provided for upright storage. No tools are required for assembly, disassembly, or use.

2 Claims, 6 Drawing Sheets

COLLAPSIBLE TRAILER APPARATUS

BACKGROUND OF THE INVENTION

A collapsible trailer offers advantages not available to most typical vehicle trailers. A primary advantage is the space-saving provided in trailer storage when the trailer is not in use. The requirement for reduced storage space is advantageous for more than one reason. Reduced storage space for a manufacturer, a shipper, and a retailer provide obvious advantages in handling and storing products. Further, the ability to store the trailer in a small area when not employed by the user is of benefit. With reduced storage space requirement provided to the end user, such as a homeowner, ownership of a utility trailer becomes economically viable, versus rental of a trailer as needed. A collapsible trailer thereby offers cost savings to all associated with such an item. A collapsible trailer is needed, with collapsibility and extension that is basic, adjustable, and requires no tools.

FIELD OF THE INVENTION

The collapsible trailer apparatus relates to trailers and more especially to a collapsible trailer that is also length adjustable and capable of partial disassembly, without the need for tools in collapsibility, disassembly, or extension.

DESCRIPTION OF THE PRIOR ART

Prior related art U.S. Pat. No. 3,612,600 issued to Salichs on 10-12-1971 teaches a relatively complex collapsible trailer. The trailer does not adjustably collapse, does not telescope, and is hinged. The trailer therefore does not offer the basic tool-less design and convenience of the present apparatus. U.S. Pat. No. 6,962,370 issued to Simpson on 11-08-2005 teaches a hinged collapsible trailer that also requires tools and is much more complex than the present apparatus. The trailer does not provided telescoping collapsibility. U.S. Pat. No. 4,768,806 issued to Tetreault on 09-06-1988 teaches a double-hinged collapsible trailer which is far more complex than the present apparatus, without offering the same advantages. The prior art does not teach a telescoping trailer providing the combined advantages of basic design, telescoping capability, and tool-less collapse and extension of the present apparatus.

While the above-described devices fulfill their respective and particular objects and requirements, they do not describe a collapsible trailer apparatus that provides for the advantages of the present collapsible trailer apparatus. In this respect, the present collapsible trailer apparatus substantially departs from the conventional concepts and designs of the prior art. Therefore, a need exists for an improved collapsible trailer apparatus.

SUMMARY OF THE INVENTION

The general purpose of the collapsible trailer apparatus, described subsequently in greater detail, is to provide a collapsible trailer apparatus which has many novel features that result in an improved collapsible trailer apparatus which is not anticipated, rendered obvious, suggested, or even implied by prior art, either alone or in combination thereof.

To attain this, the collapsible trailer apparatus provides for an extended length for use, and a collapsed length for storage. The apparatus may also be partially disassembled, without tools. Embodiments of the apparatus also provide for a choice in length, by providing a telescoping tongue. Embodiments also are provided which enable the telescoping tubes of the end members to be inserted into the frame tubes as chosen, for a choice in overall length of the apparatus. Hitch pins with pin clips provide instantly removable securing means for the telescoping tubes and for the tongue.

The trailer apparatus is offered whereby components may be selected or excluded. The end members can be with or without uprights and end panels. The side rails can be provided or negated, as the trailer apparatus can function without them. The side panels can be provided or excluded, also. Side panel pairs and matching side rail pairs are provided in a plurality of different lengths, whereby usable length of the trailer apparatus can be chosen. Fenders are attached to the outer frame tubes, for insured rigidity of fenders. Reflectors are provided as needed. Tail lights, brake lights, and directional lights are provided, preferably in combination.

The disassembled apparatus can be stored as chosen, with the optional supporting prop legs used as needed. Floor panels are provided in one length or in sections, as desired. Side panels are easily removed.

Thus has been broadly outlined the more important features of the improved collapsible trailer apparatus so that the detailed description thereof that follows may be better understood and in order that the present contribution to the art may be better appreciated.

An object of the collapsible trailer apparatus is to be collapsible to a size smaller than that occupied in use.

Another object of the collapsible trailer apparatus is to provide support of the apparatus when no in use.

A further object of the collapsible trailer apparatus is to provide telescoping length adjustment.

An added object of the collapsible trailer apparatus is to basic in design.

And, an object of the collapsible trailer apparatus is to provide telescoping, collapse, and use without the need for tools.

Also, an object of the collapsible trailer apparatus is to provide optional components.

These together with additional objects, features and advantages of the improved collapsible trailer apparatus will be readily apparent to those of ordinary skill in the art upon reading the following detailed description of presently preferred, but nonetheless illustrative, embodiments of the improved collapsible trailer apparatus when taken in conjunction with the accompanying drawings.

In this respect, before explaining the current embodiments of the improved collapsible trailer apparatus in detail, it is to be understood that the collapsible trailer apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved collapsible trailer apparatus. It is therefore important that the claims be regarded as including such equivalent constructions insofar as they do not depart from the spirit and scope of the collapsible trailer apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the collapsible trailer apparatus generally designated by the reference number 10 will be described.

Figure 1:
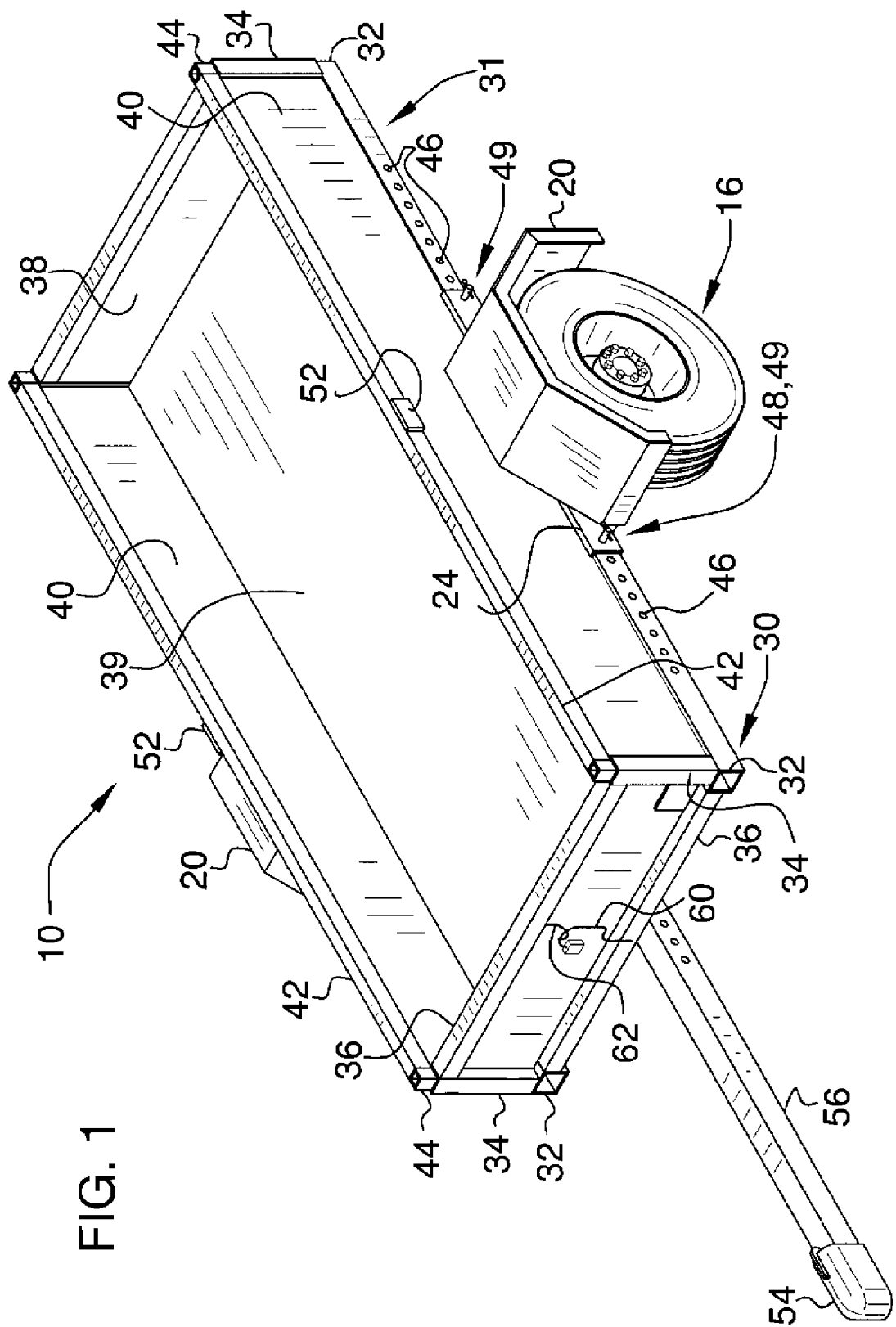
FIG. 1 is a frontal perspective view.
Figure 2:
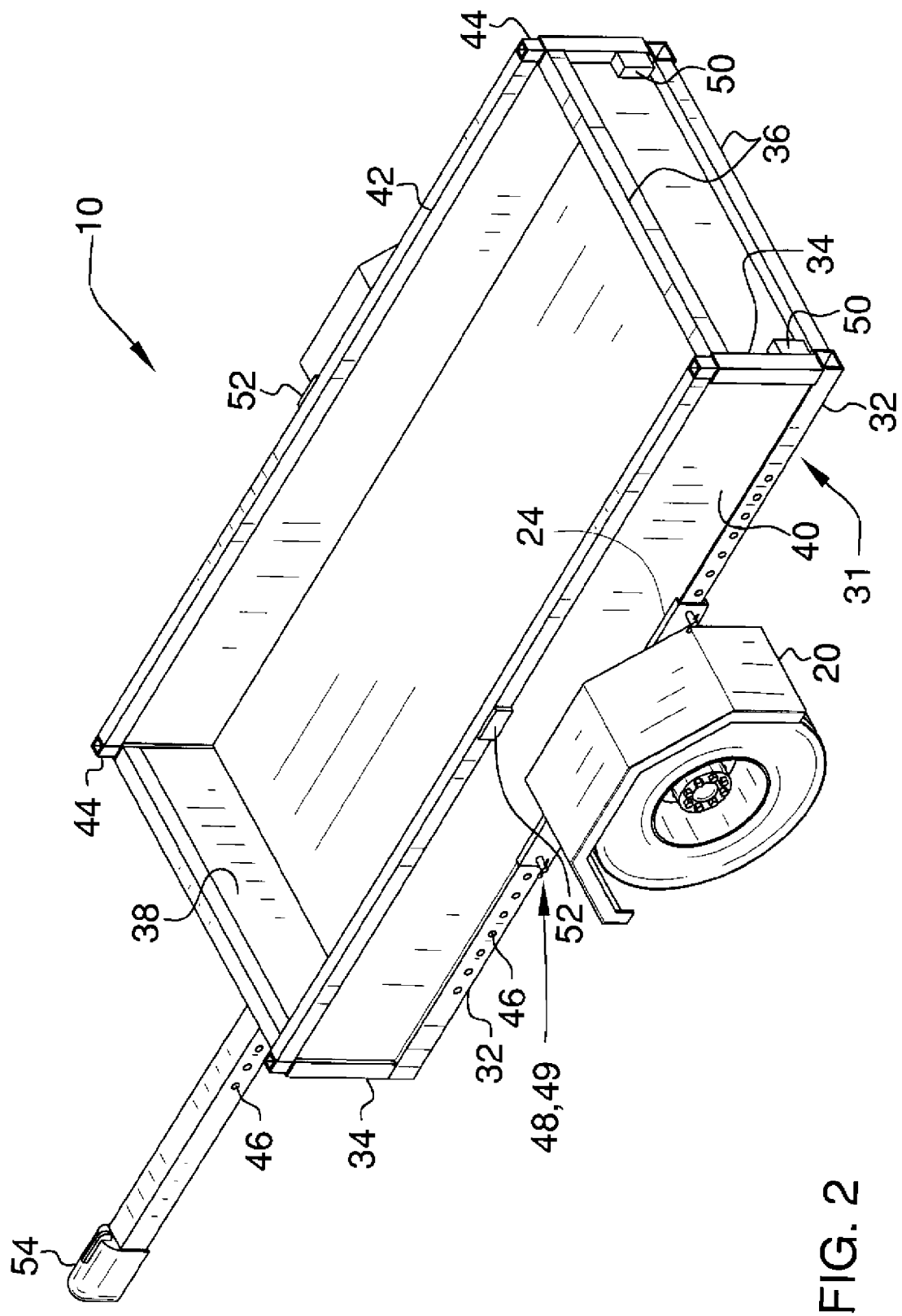
FIG. 2 is a rear perspective view.
Figure 3:
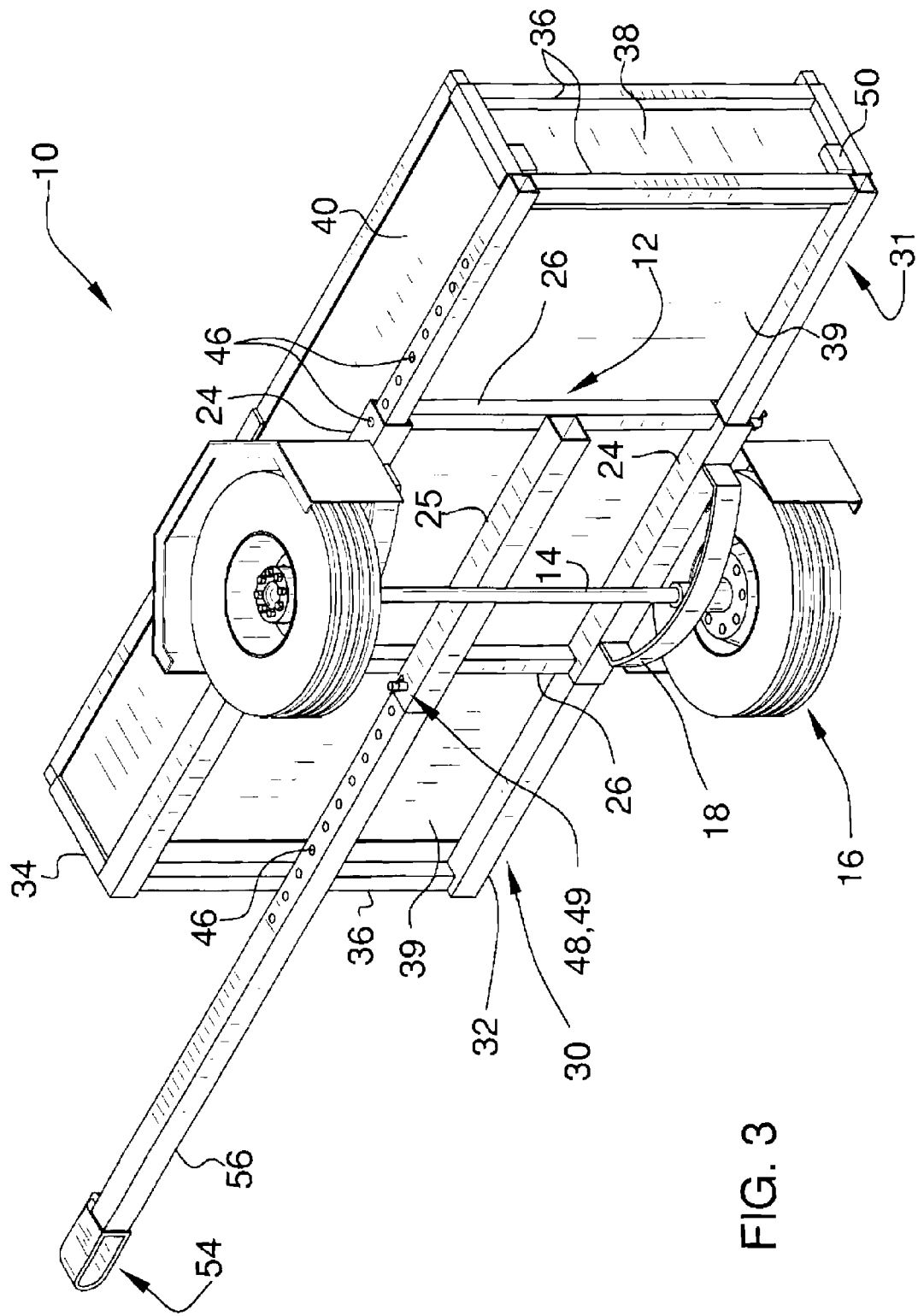
FIG. 3 is an underside perspective view.

Referring to FIGS. 1, 2, and 3, the collapsible trailer apparatus 10 comprises a center longitudinal frame tube 24 and two outer longitudinal frame tubes 25. Each outer frame tube 25 and the center frame tube 24 have a front end, a back end, and a length therebetween. An orifice 46 is disposed proximal to the front end of each outer frame tube 25 and the center frame tube 24. An orifice 46 is disposed proximal to the back end of each outer frame tube 25. A pair of spaced apart cross braces 26 connects the outer frame tubes 25 and the center frame tube 24.

The cross braces 26 are preferably equidistantly spaced. A spring 18 is affixed to the bottom of each outer longitudinal frame tube 25. The spring 18 is preferably a leaf spring 18, although other spring 18 types are optionally available. The axle 14 is affixed to the springs 18. The axle 14 has two spaced apart opposite ends. A wheel/tire assembly 16 is affixed to each axle 14 end. The apparatus further comprises a removable tongue 56. The tongue 56 has a first end, a second end, and a length therebetween. The second end of the tongue 56 is removably fitted within the center frame tube 24. A plurality of orifices 46 is disposed in part of the length of the tongue 56. The tongue 56 orifices 46 are proximal to the second end of the tongue 56. A hitch pin 48 is provided for removable insertion through one of the tongue 56 orifices 46 and the orifice 46 of the center frame tube 24. The tongue 56 is thereby length adjustable with regard to the center frame tube 24. A pin clip 49 is removably inserted into the hitch pin 48 for hitch pin 48 retention. The ball coupler 54 is disposed on the first end of the tongue 56. The ball coupler 54 is available in a plurality of size offerings. A first end member 30 and a second end member 31 are provided. The first end member 30 and the second end member 31 each comprise a pair of spaced apart telescoping tubes 32. Each telescoping tube 32 has a first end and a second end. The first end of each of the telescoping tubes 32 of the first end member 30 is removably fitted within the front ends of the outer frame tubes 25. The first ends of the telescoping tubes 32 of the second end member 31 are removably fitted within the second end of the outer frame tubes 25. A cross piece 36 connects the second end of each pair of telescoping tubes 32.

A plurality of orifices 46 is disposed proximal to the first end of each of the telescoping tubes 32. A hitch pin 48 is provided for selective removable insertion through one of each telescoping tube 32 orifice 46 of the first end member 30 and the orifice of one of the outer frame tubes 25, whereby the telescoping tube 32 orifice 46 chosen determines the trailer apparatus 10 length. A pin clip 49 is removably inserted into the hitch pin 48 for selective hitch pin 48 retention within the given orifices 46. Directional, brake, and tail lights 50 are preferably provided as a unit. Lights 50 are affixed to the cross piece 36 of the second end member 31. The wiring harness 60 is provided for hooking vehicle electrical supply to the trailer apparatus 10. The harness 60 is n communication with the lights 50.

Figure 4:
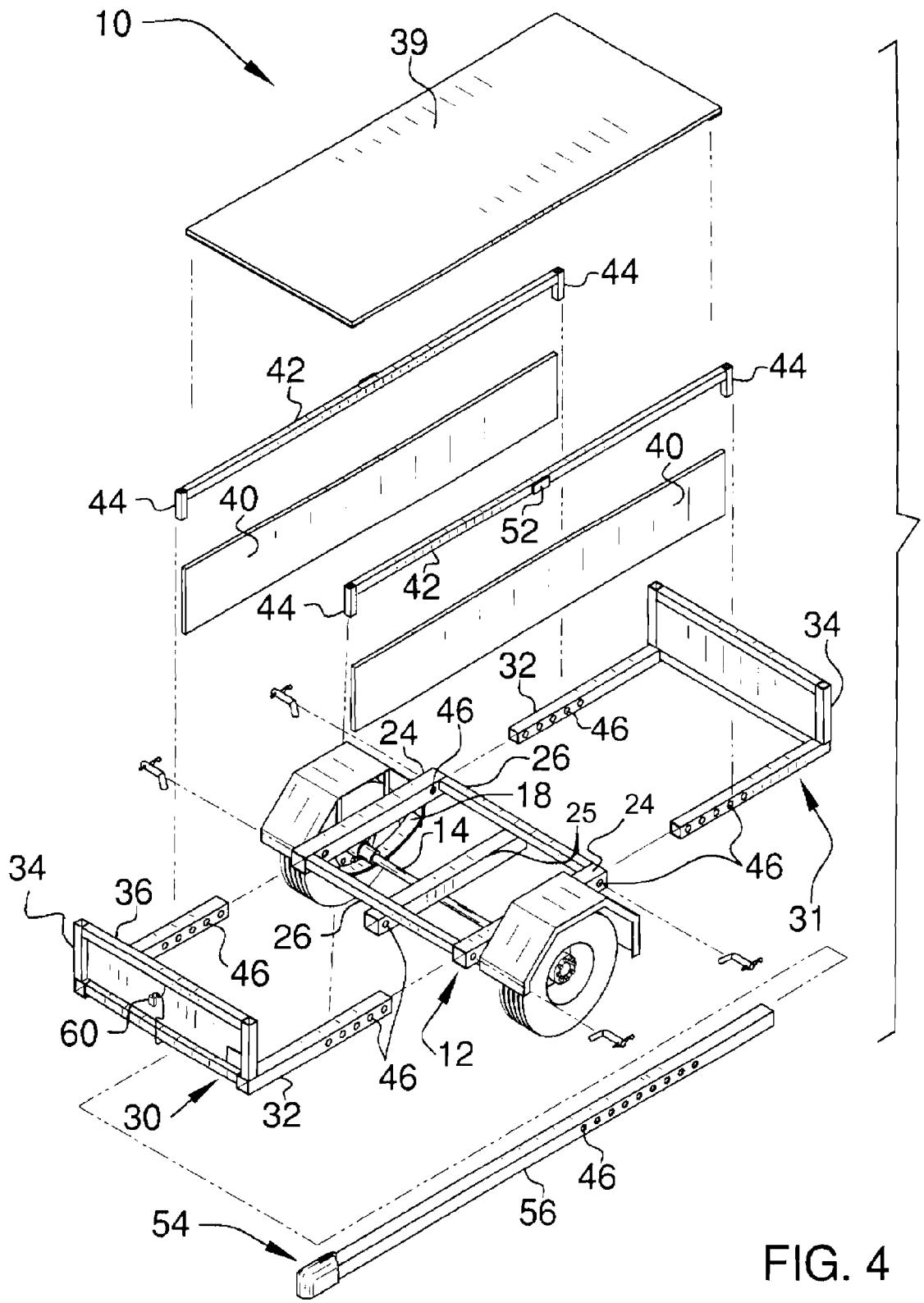
FIG. 4 is an exploded perspective view.

Referring to FIG. 4, the apparatus 10 further comprises a hollow upright 34 on each second end of each telescoping tube 32 of both the first end member 30 and the second end member 31. A cross piece 36 connects the uprights 34 of the first end member 30. A cross piece 36 connects the uprights of the second end member 31. An end panel 38 is fitted below the cross piece 36 on the first end member 30 and also on the second end member 31. The apparatus 10 further comprises a plurality of side rail 42 pairs. Each side rail 42 comprises a rail insert 44 on each opposite end of the side rail 42. Each insert 44 removably inserts into one upright 34 of the first end member 30 and one upright 34 of the second end member 31. A rail channel 43 is disposed on the bottom of each side rail 42. A plurality of side panel 40 pairs is optionally provided. Each side panel 40 pair matches a pair of side rails 42. Each side panel 40 removably fits into a rail channel 43. Side rail 42 pairs may be provided in only one length.

Side rail 42 pairs may optionally be provided in a plurality of lengths, whereby combining chosen side rail 42 lengths with telescoping tube 32 appropriate orifices 46 dictates trailer apparatus 10 length. Side panel 40 pairs are matched with side rail 42 pairs. The trailer apparatus 10 may also be provided without uprights 34 and associated end panels 38. Side rails 42 may also be optional. A fender 20 is fitted to an outside of each outer frame tube 25. Each fender 20 is disposed above one of the wheel/tire assemblies 16. Preferably, at least one reflector 52 is disposed on each side rail 42.

Figure 5:
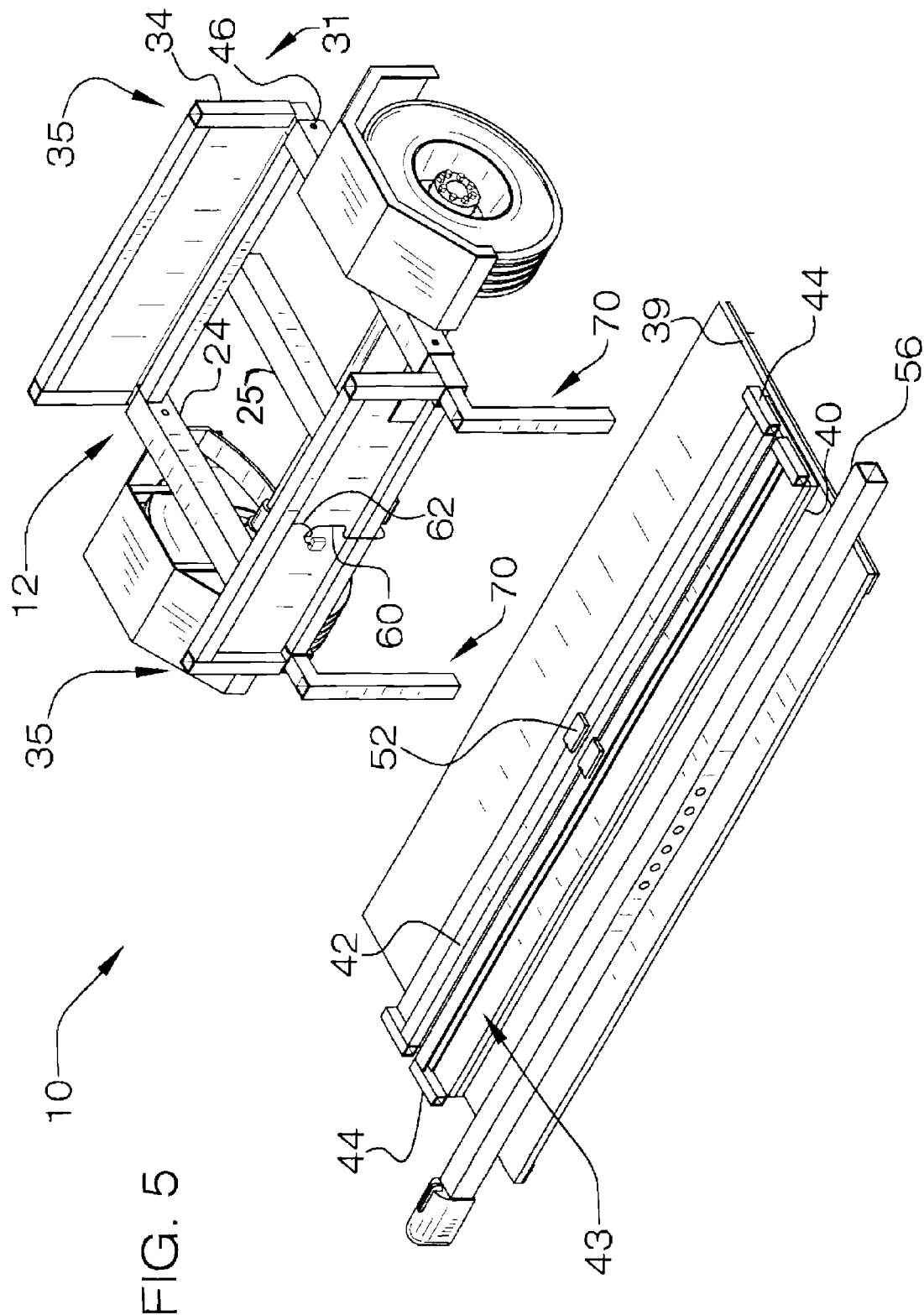
FIG. 5 is a perspective view of the apparatus collapsed, with side panels, side rails, and tongue removed.

Referring to FIG. 5, the apparatus 10 is in the collapsed state. Pin clips 49 are removed from the hitch pins 48 in the telescoping tubes and the outer frame tubes 25. The stated hitch pins 48 are removed. The pin clip 49 is removed from the hitch pin 48 in the tongue 56 and center frame tube 24. The hitch pin 48 is removed from the tongue 56 and center frame tube 24. The telescoping tubes 32 are slid into the outer frame tubes 25, thereby decreasing the apparatus 10 length. Telescoping tubes 32 may also be completely removed from the outer frame tubes 25, by choice. The right angle prop legs 70 are inserted into the telescoping tubes 32 of the second end member 31 for support. The side rails 42 have been lifted from the upright openings 35 of the uprights 34. Lifting the side rails 42 has released the securing of the side panels 40 from the rail channels 43. the tongue 56 has been removed from the center frame tube 24 via removal of the pin clip 49 from the hitch pin 48, and the subsequent hitch pin 48 removal form the tongue and the center frame tube 24. The floor panel 39 has been removed from the apparatus 10.

The floor panel 39 may be optionally provided in sections to provide for the various selectable lengths of the apparatus 10. The harness loop 62 provides handy storage for the harness 60 when not in use.

Figure 6:
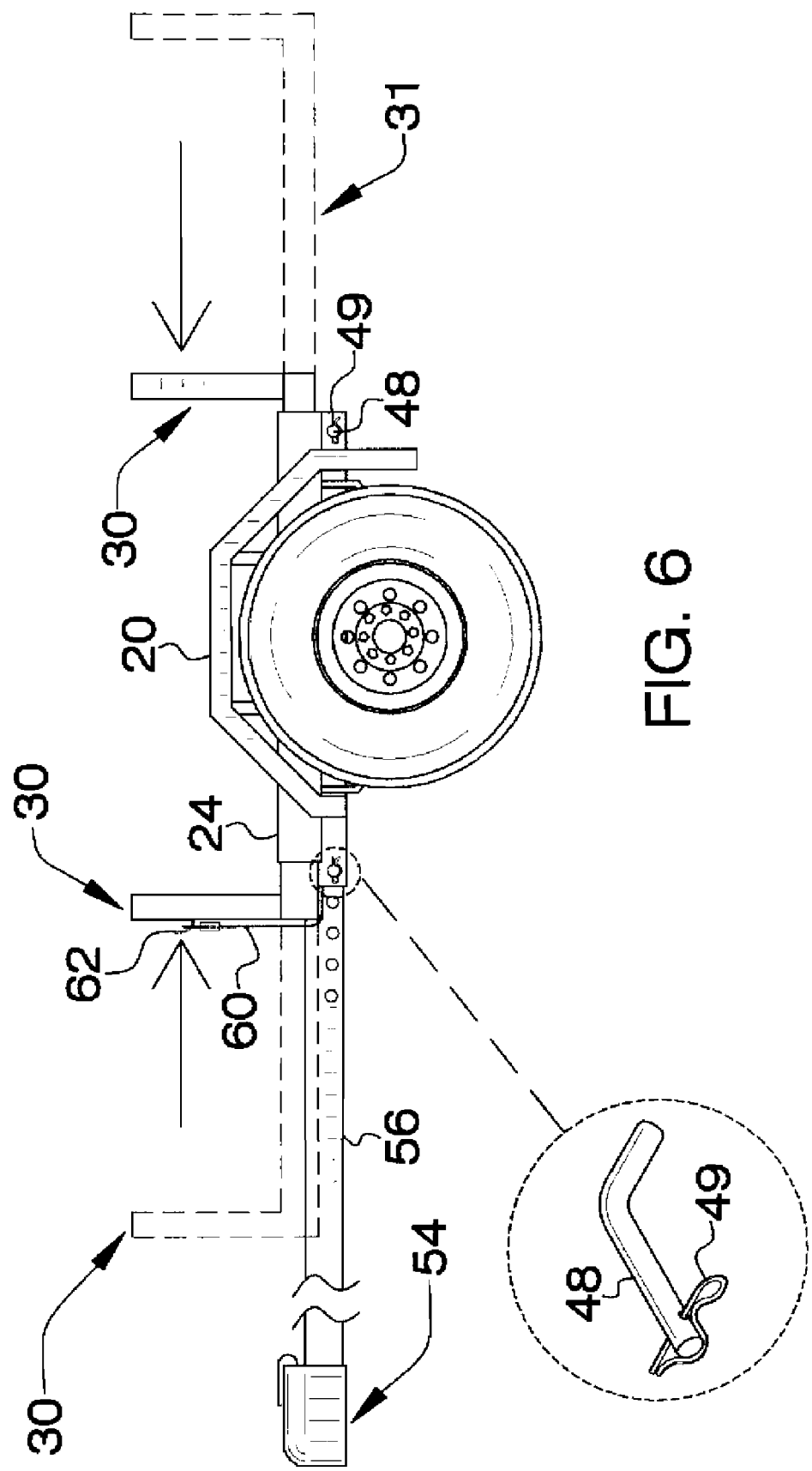
FIG. 6 is a side elevation view of expansion capability of the apparatus.

FIG. 6 illustrates telescoping capability of the first end member 30 and the second end member 31 within the outer frame tubes 24. The tongue 56 length is also telescopic.

With respect to the above description then, it is to be realized that the optimum dimensional relationships for the parts of the collapsible trailer apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the collapsible trailer apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the collapsible trailer apparatus may be used.

Therefore, the foregoing is considered as illustrative only of the principles of the collapsible trailer apparatus. Further, since numerous modifications and changes will readily occur to those skilled in the art, it is not desired to limit the collapsible trailer apparatus to the exact construction and operation shown and described, and accordingly, all suitable modifications and equivalents may be resorted to, falling within the scope of the collapsible trailer apparatus.

What is claimed is:

1. A collapsible trailer apparatus comprising:
   three spaced apart tubular longitudinal frame tubes comprising a center longitudinal frame tube and two outer longitudinal frame tubes, each frame tube having a front end, a back end, and a length therebetween;
   a pair of spaced apart cross braces connecting the longitudinal frame tubes;
   a spring affixed to a bottom of each outer longitudinal frame tube;
   an axle affixed to the springs, the axle having two spaced apart opposite ends;
   a wheel/tire assembly affixed to each axle end;
   a tongue, the tongue having a first end, a second end, and a length therebetween, the second end of the tongue removably fitted within the center frame tube;
   means for temporarily fastening the tongue within the center frame tube;
   a ball coupler on the first end of the tongue;
   a pair of end members, a first end member and a second end member, each end member comprising:
      a pair of spaced apart telescoping tubes, each telescoping tube having a first end and a second end, the first end of the telescoping tubes of the first end member removably fitted within the front ends of the outer frame tubes, the first ends of the telescoping tubes of the second end member removably fitted within the second end of the outer frame tubes;
      a cross piece connecting the second end of each pair of telescoping tubes;
   means for temporarily fastening the end members within the frame tubes;
   directional lights affixed to the cross piece of the second end member;
   brake lights affixed to the cross piece of the second end member;
   tail lights affixed to the cross piece of the second end member;
   a wiring harness for electrical supply to the trailer apparatus, the wiring harness in communication with the directional lights, the brake lights, and the tail lights;
   wherein a fender is fitted to an outside of each outer frame tube, each fender disposed above one of the wheel/tire assemblies;
   wherein the tongue is further comprised of an orifice;
   an orifice proximal to the front end of the center frame tube;
   a hitch pin for removable insertion through the tongue orifice and the orifice of the center frame tube;
   a pin clip removably inserted into the hitch pin;
   wherein part of the length of the tongue is further comprised of a plurality of orifices for the selective choice of hitch pin insertion;
   a hollow upright on each second end of each telescoping tube of both the first end member and the second end member;
   a cross piece connecting the uprights of the first end member;
   a cross piece connecting the uprights of the second end member;
   an end panel fitted below the cross piece on each end member;
   a side rail for an each side of the trailer, each side rail having opposite ends and a length therebetween, each side rail further comprising:
      a rail insert on each opposite end of the side rail, each insert for removable insertion into one upright of the first end member and one upright of the second end member;
      a rail channel on a bottom of each side rail;
   a side panel for removable fit into each rail channel.

2. A collapsible trailer apparatus comprising
   three spaced apart tubular longitudinal frame tubes comprising a center longitudinal frame tube and two outer longitudinal frame tubes, each frame tube having a front end, a back end, and a length therebetween;
   an orifice proximal to the front end of each frame tube;
   an orifice proximal to the back end of each outer frame tube;
   a pair of spaced apart cross braces connecting the longitudinal frame tubes;
   a spring affixed to a bottom of each outer longitudinal frame tube;
   an axle affixed to the springs, the axle having two spaced apart opposite ends;
   a wheel/tire assembly affixed to each axle end;
   a tongue, the tongue having a first end, a second end, and a length therebetween, the second end of the tongue removably fitted within the center frame tube;
   a plurality of orifices in part of the length of the tongue, the orifices proximal to the second end of the tongue;
   a hitch pin for removable insertion through one of the tongue orifices and the orifice of the center frame tube;
   a pin clip removably inserted into the hitch pin;
   a ball coupler on the first end of the tongue;
   a pair of end members, a first end member and a second end member, each end member comprising:
      a pair of spaced apart telescoping tubes, each telescoping tube having a first end and a second end, the first end of the telescoping tubes of the first end member removably fitted within the front ends of the outer frame tubes, the first ends of the telescoping tubes of the second end member removably fitted within the second end of the outer frame tubes;
      a cross piece connecting the second end of each pair of telescoping tubes;
      a plurality of orifices proximal to the first end of each of the telescoping tubes;
   a hitch pin for selective removable insertion through one of each telescoping tube orifice of each end member and the orifice of one of the outer frame tubes, whereby the telescoping tube orifices chosen determines a trailer apparatus length;
   a pin clip removably inserted into the hitch pin;
   directional lights affixed to the cross piece of the second end member;
   brake lights affixed to the cross piece of the second end member;
   tail lights affixed to the cross piece of the second end member;
   a wiring harness for electrical supply to the trailer apparatus, the harness in communication with the directional lights, the brake lights, and the tail lights;

prop legs for removable insertion into the outer frame tubes;
a hollow upright on each second end of each telescoping tube of both the first end member and the second end member;
a cross piece connecting the uprights of the first end member;
a cross piece connecting the uprights of the second end member;
an end panel fitted below the cross piece on each end member;
a plurality of side rail pairs, each pair of a different length, each side rail having opposite ends, each side rail further comprising:
  a rail insert on each opposite end of the side rail, each insert for removable insertion into one upright of the first end member and one upright of the second end member;
  a rail channel on a bottom of each side rail;
a plurality of side panel pairs, each side panel pair matching a pair of side rails, each side panel removably fitted into a rail channel;
wherein a fender is fitted to an outside of each outer frame tube, each fender disposed above one of the wheel/tire assemblies;
at least one reflector disposed on each side rail.

* * * * *